Sept. 16, 1958     C. C. ENGLISH     2,852,309

LAWN SPRINKLER

Filed June 14, 1956

Charles C. English,
INVENTOR.

BY Loyal J. Miller
ATTORNEY

United States Patent Office 2,852,309
Patented Sept. 16, 1958

2,852,309

LAWN SPRINKLER

Charles C. English, Shawnee, Okla.

Application June 14, 1956, Serial No. 591,399

2 Claims. (Cl. 299—126)

The present invention relates to lawn water sprinklers, and has reference more particularly to the portable type of sprinkler which is adapted to be attached to the end of a garden hose.

The prior art reveals a number of different types of water sprinklers, but most of these devices have the common fault of dispersing the full force of the water pressure simultaneously through a plurality of nozzles or openings. This results in limiting the sprinkled area to a relatively small portion of the lawn and necessitates the frequent movement of the sprinkler to a new location.

The principal object of the present invention is to provide a water sprinkler which will spray substantially a larger area than conventional sprinklers of a comparable size.

An equally important object is to provide a water sprinkler which is relatively small and light in weight and thus may be easily moved from one location to another.

Another object is to provide a sprinkler of this class having a plurality of water dispersing nozzles which direct the full force of the water pressure against each nozzle in consecutive sequence.

An additional object is to provide a sprinkler of this character which has only one moving part to become worn or get out of order.

A further object is to provide a sprinkler of this class which includes a plurality of restrictive spray nozzles removably carried by the top of the sprinkler.

The present invention anticipates a hollow cylindrical body having a hose connection and journaling a pair of disks rigidly connected in spaced-apart relation by a plurality of radially spaced vanes. The upper surface of the body is provided with a plurality of circumferentially spaced-apart spray nozzles. As water enters the body, rotating the disks by means of the vanes, a recess in the periphery of the uppermost disk emits water through the spray nozzles in sequence as the recess uncovers and covers the lowermost ends of the nozzles.

Other objects will be apparent from the following description when taken in conjunction with the accompanying single sheet of drawings, wherein.

Like characters of reference designate like parts in those figures of the drawings in which they occur.

In the drawings.

Figure 1:
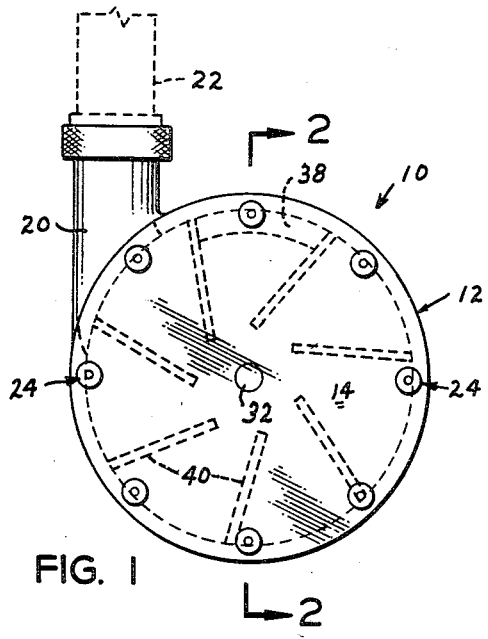
Figure 1 is a top view of the sprinkler.

The reference numeral 10 indicates the device, as a whole, which comprises, in general configuration, a substantially cylindrical body 12 having a closed upper end or top 14 and a lower end closed by a bottom plate 16 removably connected to the body by screws 18. A tubular projection 20 is integrally carried by the wall of the body in communication with its hollow interior for connection with a garden hose 22. The top 14 is plurally perforated adjacent its periphery in circumferentially spaced-apart relation for threadedly receiving a like plurality of spray nozzles 24. The perforations are angularly drilled through the top 14 with relation to the perpendicular so that the openings of the nozzles are pointed or directed outwardly beyond the circumferential edge of the body.

Each nozzle 24 comprises an exteriorly threaded shank 26 and a flanged top 28 which is centrally throughperforated. The perforation 30 of each nozzle preferably tapers or converges upwardly from the bottom of the shank 26 to the central portion of the flanged top 28, thus compressing or restricting the water as it passes through the nozzle.

Figure 2:
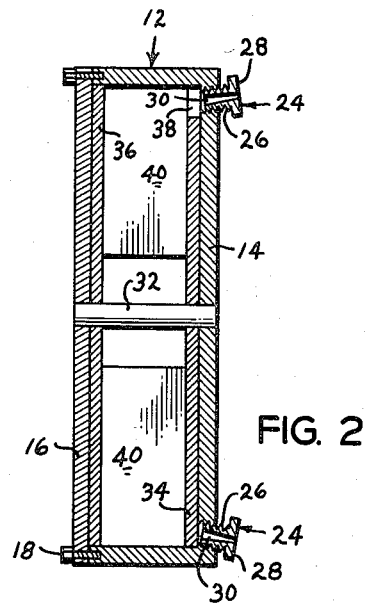
Figure 2 is a vertical cross sectional view taken substantially along line 2—2 of Fig. 1; and, Figure 3 is a perspective view of the rotating disks and vanes, per se.
Figure 3:
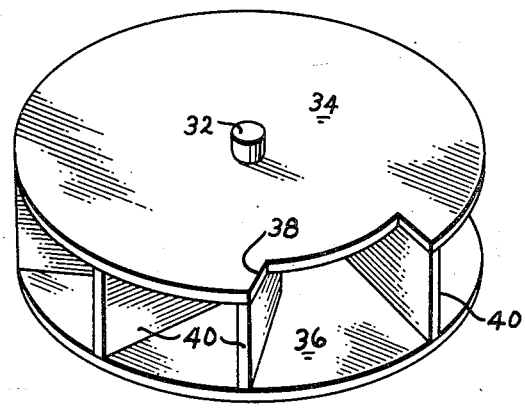

A shaft or axle 32 is axially journaled by the top and bottom of the body and rigidly carries an upper disk 34 and a lower disk 36 in parallel spaced-apart relation adjacent the inner surface of the top and bottom, respectively. The peripheries of the disks 34 and 36 are closely received by the wall of the body. The disks are rigidly interconnected by a plurality of vertically disposed radially extending vanes 40. The upper disk 34 is provided with a peripheral recess 38 formed between one set of the vanes 40 which permits water to enter the body and to be ejected outwardly between the said two disks under pressure through the nozzles 24 in consecutive order as the disks are rotated. The circumferential extent of the arc encompassed by the recess 38 is such that it substantially spans the distance between two of the nozzles 24 to prevent the disks and vanes stoping on "dead center." Transversely the recess 38 is sufficiently wide to uncover the lower end of each nozzle 24, as is clearly shown in Fig. 2. The vanes 40 extend inwardly from the circumference of the disks in angular relation with respect to the radius of the disks and end in spaced-apart relation from the axle or shaft 32 (Fig. 1) to allow water entering the sprinkler to be directed between all vanes, and outward through the recess 38 and nozzles 24, regardless of the position of the disks.

Obviously the lower disk 36 may be eliminated without altering the efficiency or operability of the sprinkler.

Operation

In operation the sprinkler 10 is connected to a garden hose 22 and the sprinkler placed in the desired location. Water under pressure enters the sprinkler from the hose and revolves the disks by means of the vanes 40, thus spraying water outwardly through the nozzles 24 as the recess 38 is rotated by the nozzles. The screws 18 may be countersunk into the bottom in a conventional manner, if desired, thus permitting the sprinkler to be moved by dragging without entanglement with grass stems or roots.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A lawn sprinkler, including: a hollow cylindrical body having parallel ends forming a top and a bottom, said body having an integral tubular projection in communication with its hollow interior for connection with a supply of water under pressure; a plurality of water dispersing nozzles rigidly carried in circumferentially equally spaced-apart relation by said top in communication with the interior of said body; an axle journaled by said body; a pair of disks rigidly connected to said axle in parallel spaced-apart relation adjacent the inner surface of said top and said bottom, respectively, the uppermost said disk having one recess in its periphery for covering and uncovering the lower end of said nozzles as the disks are rotated for ejecting water therethrough, the length of said recess being substantially equal with relation to the spacing between two of said nozzles; and a plurality of vanes rigidly connected radially to said disks for rotating the same by the movement of water through the sprinkler.

2. Structure as specified in claim 1, in which the nozzles are angularly disposed with relation to the plane of said top.

References Cited in the file of this patent

UNITED STATES PATENTS

| | | |
|---|---|---|
| 581,785 | Smith | May 4, 1897 |
| 963,089 | Storey | July 5, 1910 |
| 1,454,280 | Henrikson | May 8, 1923 |
| 1,779,336 | Riley | Oct. 21, 1930 |
| 2,584,960 | Beardsell | Feb. 5, 1952 |
| 2,668,079 | Menegus | Feb. 2, 1954 |